Patented Dec. 12, 1922.

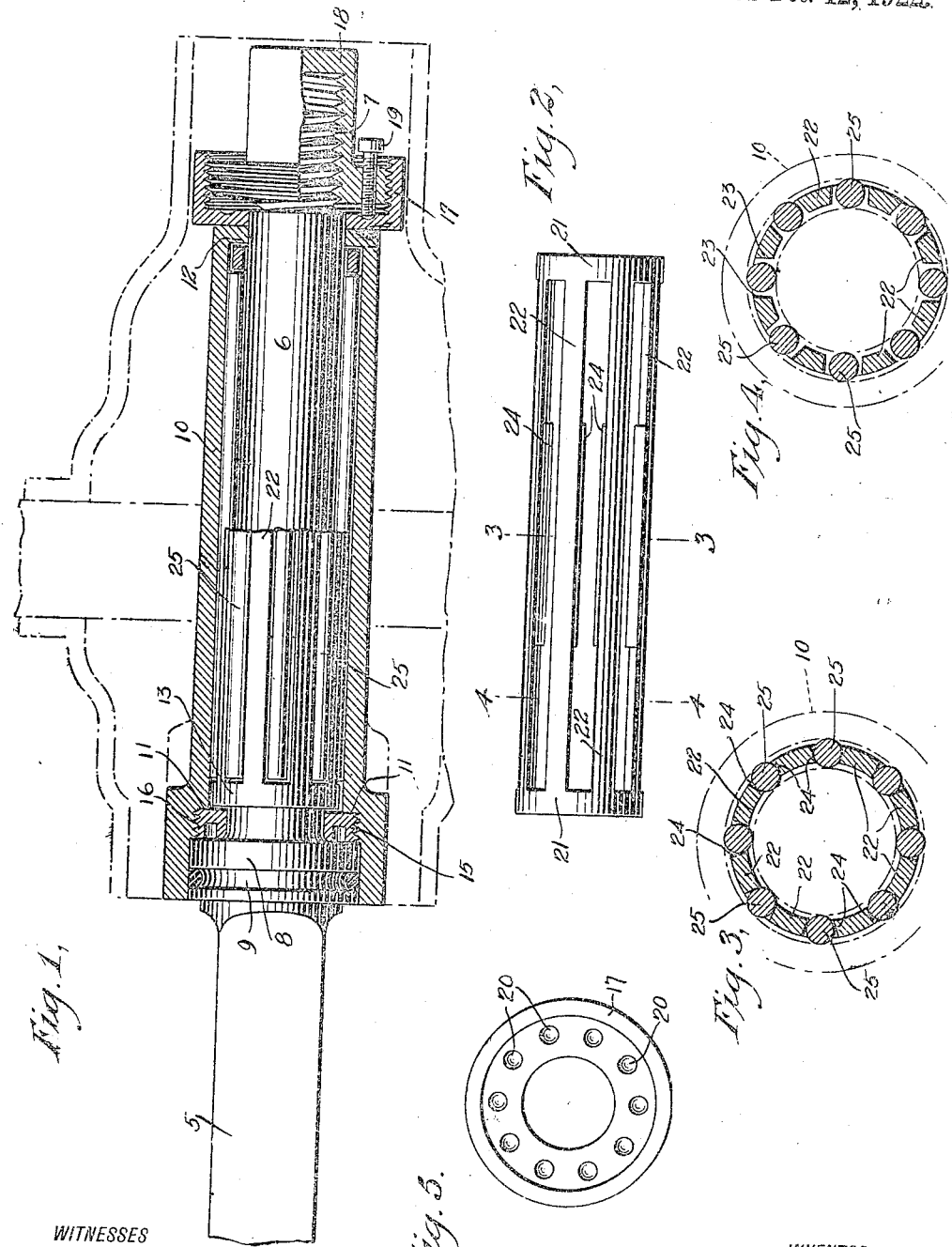

1,438,472

UNITED STATES PATENT OFFICE.

LEONARD S. ALDRIDGE, OF CHAZY, NEW YORK.

ROLLER BEARING.

Application filed June 16, 1921. Serial No. 477,992.

*To all whom it may concern:*

Be it known that I, LEONARD S. ALDRIDGE, a citizen of the United States, and a resident of Chazy, in the county of Clinton and State of New York, have invented a new and Improved Roller Bearing, of which the following is a full, clear, and exact description.

This invention relates to improvements in roller bearings, an object of the invention being to provide a roller bearing for wheel axles, in which a minimum number of parts are utilized to obtain a maximum of efficiency.

To be more specific, one object of the invention is to provide a roller bearing in which the rollers are carried by a cage and provides means for locking the cage within the axle box or sleeve, so that there is no danger of losing the roller bearings when the wheel is removed from the axle.

Another object is to provide a bearing which will be simple and practical in construction, strong and durable in use, which will need very little attention, and which will be comparatively inexpensive to manufacture.

With these and other objects in view, the invention consists in certain novel features of construction and combinations and arrangements of parts, as will be more fully hereinafter described and pointed out in the claims.

In the accompanying drawings:—

Figure 1 is a view mainly in longitudinal section through a wheel axle with parts broken away for clearness;

Figure 2 is a view in side elevation of the bearing cage;

Figure 3 is a view in section on the line 3—3 of Figure 2, the dotted lines indicating the axle sleeve;

Figure 4 is a similar view on the line 4—4 of Figure 2; and

Figure 5 is a plan view of the locking sleeve 17.

Referring in detail to the drawings, 5 represents an axle formed with the usual spindle 6. The spindle is screw threaded adjacent its outer end, as indicated at 7. A shoulder 8 around the inner end of the spindle is provided with a dust groove 9.

The axle sleeve or box 10 is provided at its inner end with an internally enlarged bore formng a shoulder 11. The outer end of the axle sleeve is formed with an annular inturned flange 12 of the same diameter as the spindle 6. A cylindrical bearing cage 13 is accommodated within the sleeve 10 and is locked in place by a threaded gasket 15 which fits a threaded portion 16 of the sleeve 10 located between the shoulder 11 of the sleeve and the shoulder 8 of the spindle. The gasket 16 securely locks the cage 13 within the sleeve 10 so that the cage will not fall out of the sleeve when the wheel is removed from the spindle.

The sleeve is locked on the axle by a locking sleeve 17 fitting over the outer end of the spindle 6 and held against movement by a lock nut 18 screwed on to the threaded outer end of the spindle. A set screw 19 carried by the nut 18 is selectively engageable in any one of a series of pockets 20 formed in the bottom of the cup-shaped sleeve 17.

The invention in this case resides partially in the particular construction of the bearing cage 13. Referring in detail to Figures 2, 3 and 4, it will be noted that the cage which is substantially cylindrical in shape, includes end rings 21 connected by a plurality of parallel longitudinal bars 22. Adjacent their ends, the adjacent faces 23 of the bars are located in a radial plane relative to the center of the cage, but adjacent the intermediate portion of the bars 22, the two side walls of each bar are parallel, as indicated at 24 in Figures 2 and 4, to provide mounting for the intermediate portions of relatively long roller bearings 25. It will be seen that the bearings 25 are supported upon the portions 24 of the bars 22 and have no contact with the ends of the cage. This peculiar mounting of the bearings permits a slight rocking movement thereof and at the same time positively prevents the bearings from falling through the cage when the wheel is removed from the axle.

It will be noted that I provide a bearing surface which extends almost the entire length of the spindle so that there is a minimum amount of friction between the spindle and its associated parts and the sleeve.

Although I have illustrated one of the preferred embodiments of my invention it will be apparent that various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. In a roller bearing the combination with an axle spindle, and a sleeve around the spindle, of a cylindrical cage interposed between the sleeve and spindle, said cage including a plurality of parallel bars, roller bearings supported at their intermediate portions between the intermediate portions of the bars and free to rock at their ends between the ends of the bars, said bearings contacting with the sleeve and spindle.

2. In a roller bearing the combination with an axle spindle, and a sleeve around the spindle, of a cylindrical cage interposed between the sleeve and spindle, said cage including a plurality of parallel bars, roller bearings supported at their intermediate portions between the intermediate portions of the bars and free to rock at their ends between the ends of the bars, said bearings contacting with the sleeve and spindle, means locking the cage against longitudinal movement independent of the sleeve.

LEONARD S. ALDRIDGE.